Aug. 4, 1936.  W. C. McNITT  2,049,920
APPARATUS FOR GRINDING AND CHOPPING FOOD
Filed July 22, 1932  3 Sheets-Sheet 1

INVENTOR.
WILLARD C. McNITT
BY
Harry H. Hitzeman
ATTORNEY.

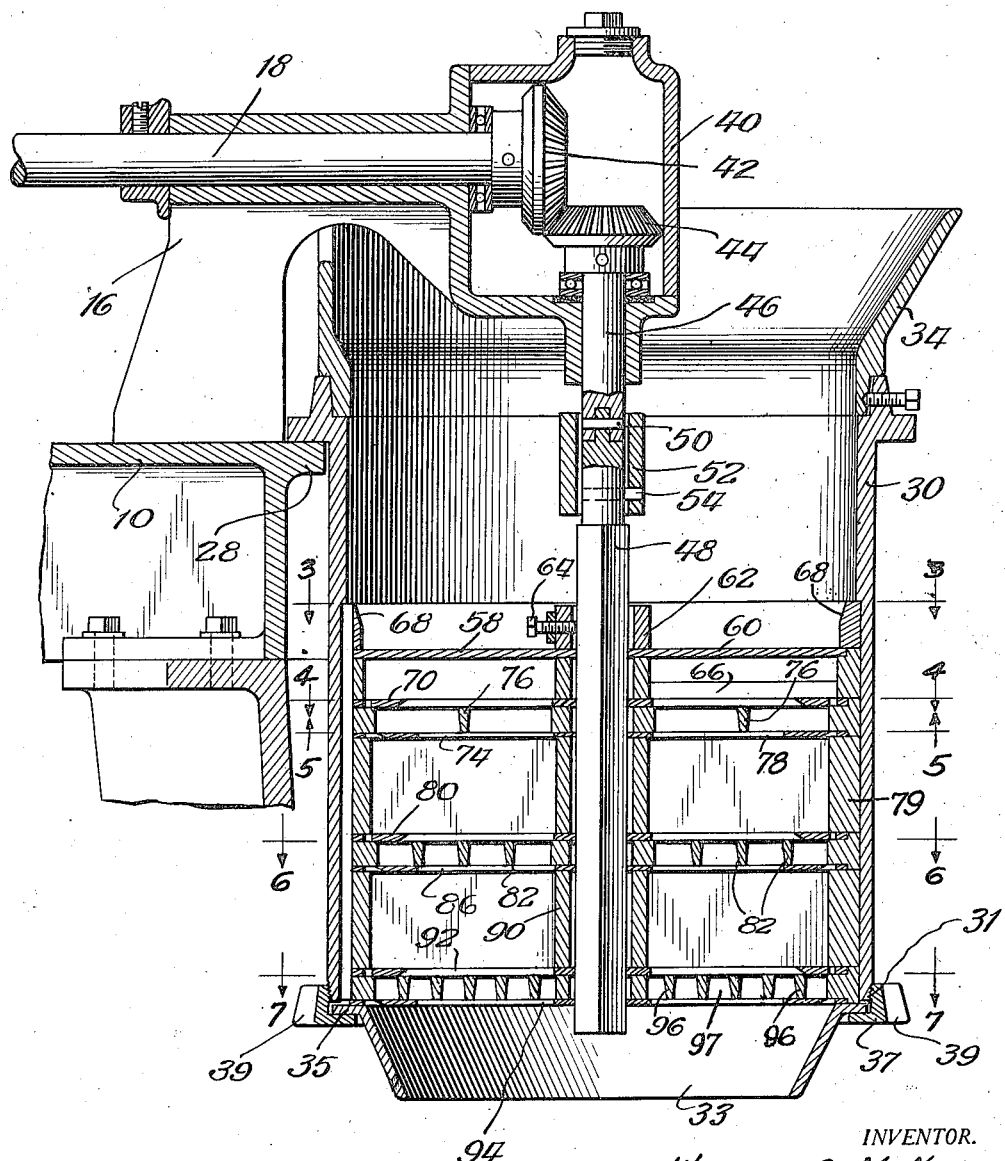

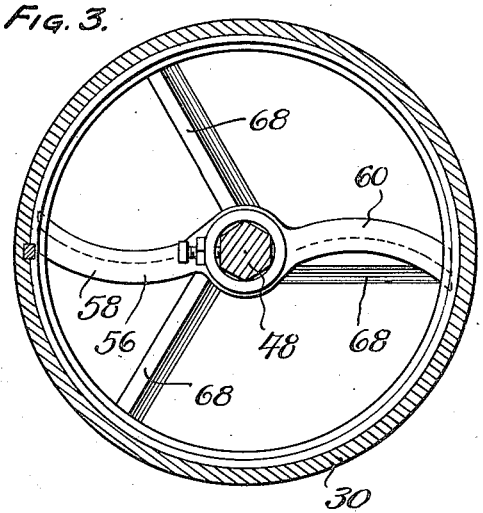
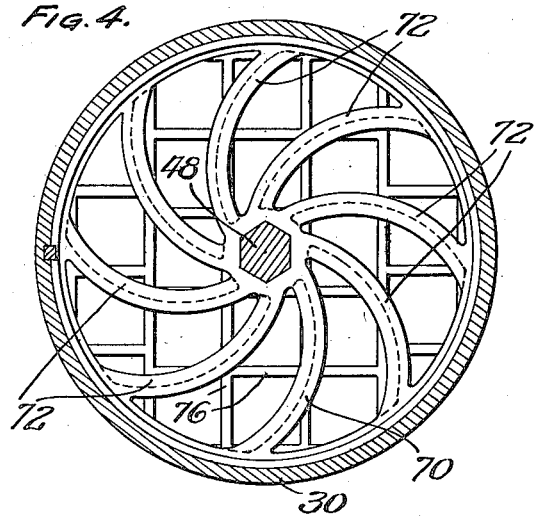
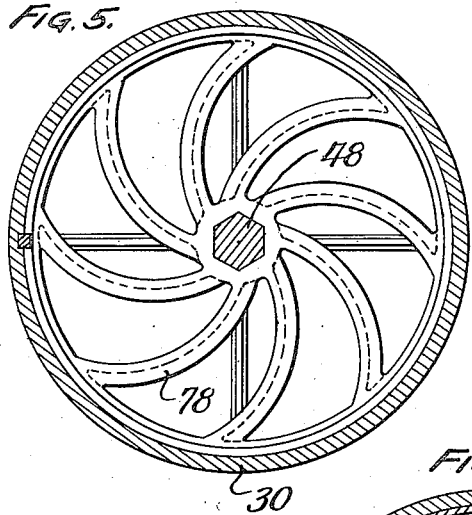
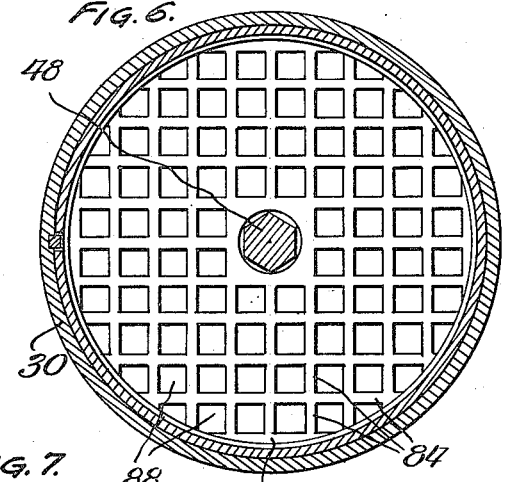
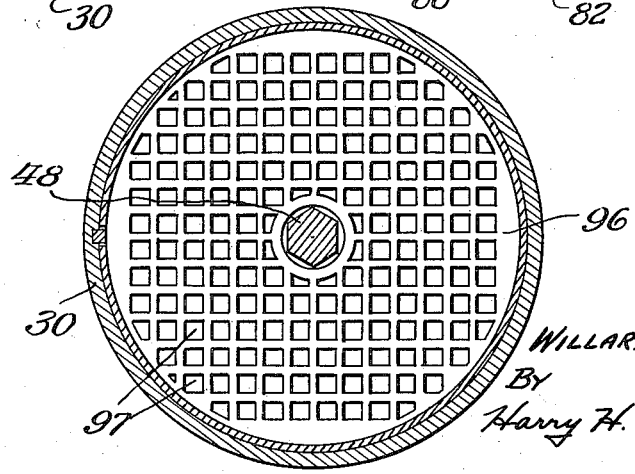

Patented Aug. 4, 1936

2,049,920

UNITED STATES PATENT OFFICE 2,049,920

APPARATUS FOR GRINDING AND CHOPPING FOOD

Willard C. McNitt, Winnetka, Ill.

Application July 22, 1932, Serial No. 624,062

5 Claims. (Cl. 146—192)

My invention relates to apparatus for grinding and chopping food and to like devices.

My invention relates more particularly to apparatus of this type used in the preparation of fruits, vegetables and other food products which are prepared by grinding or chopping for canning or for consumption.

The principal object of my invention is to provide a food grinding and chopping mechanism which is capable of chopping or grinding food products into pieces of uniform size.

A further object of the invention is to provide mechanism of the class specified that will operate effectively and that is capable of preparing food products in this manner continuously and in a great volume.

A further object of the invention is to provide mechanism of this type that is easily and simply constructed and which may be driven by a comparatively small power unit.

A further object is to provide an improved construction in machines of this type that is capable of continuous operation and through which it is not necessary to sift or repeat operations upon any foodstuffs.

A further object of the invention is to provide an improved structure in mechanism of this type that is easily assembled or disassembled in order to enable inspection or cleaning of the knives, grates or other parts therein.

A further object is to provide an improved mechanism of this type whereby the desired size of the pieces into which the food products are cut can be changed by an easy, simple setting of the mechanism which may be disassembled for this purpose by an unskilled workman.

A further object is to provide a compact mechanism of the class described which may easily be attached to any desired power unit to operate the same.

A further object is to provide an improved horizontal machine of the class described through which materials may be fed by gravity.

The above and other advantages will be more apparent from the following description wherein reference is had to the accompanying three sheets of drawings upon which Fig. 1 is a side elevational view of the mechanism and drive therefor:

Fig. 2 is a vertical sectional view taken on the plane of Fig. 1 through the horizontal chopper housing and the drive with the removable screen thereon omitted:

Fig. 3 is a plan sectional view taken on the line 3—3 of Fig. 2:

Fig. 4 is a similar plan section on the line 4—4 of Fig. 2:

Fig. 5 is a similar plan section on the line 5—5 of Fig. 2:

Fig. 6 is a similar plan section on the line 6—6 of Fig. 2: and

Fig. 7 is also a similar section taken on the line 7—7 of Fig. 2.

Figure 1:
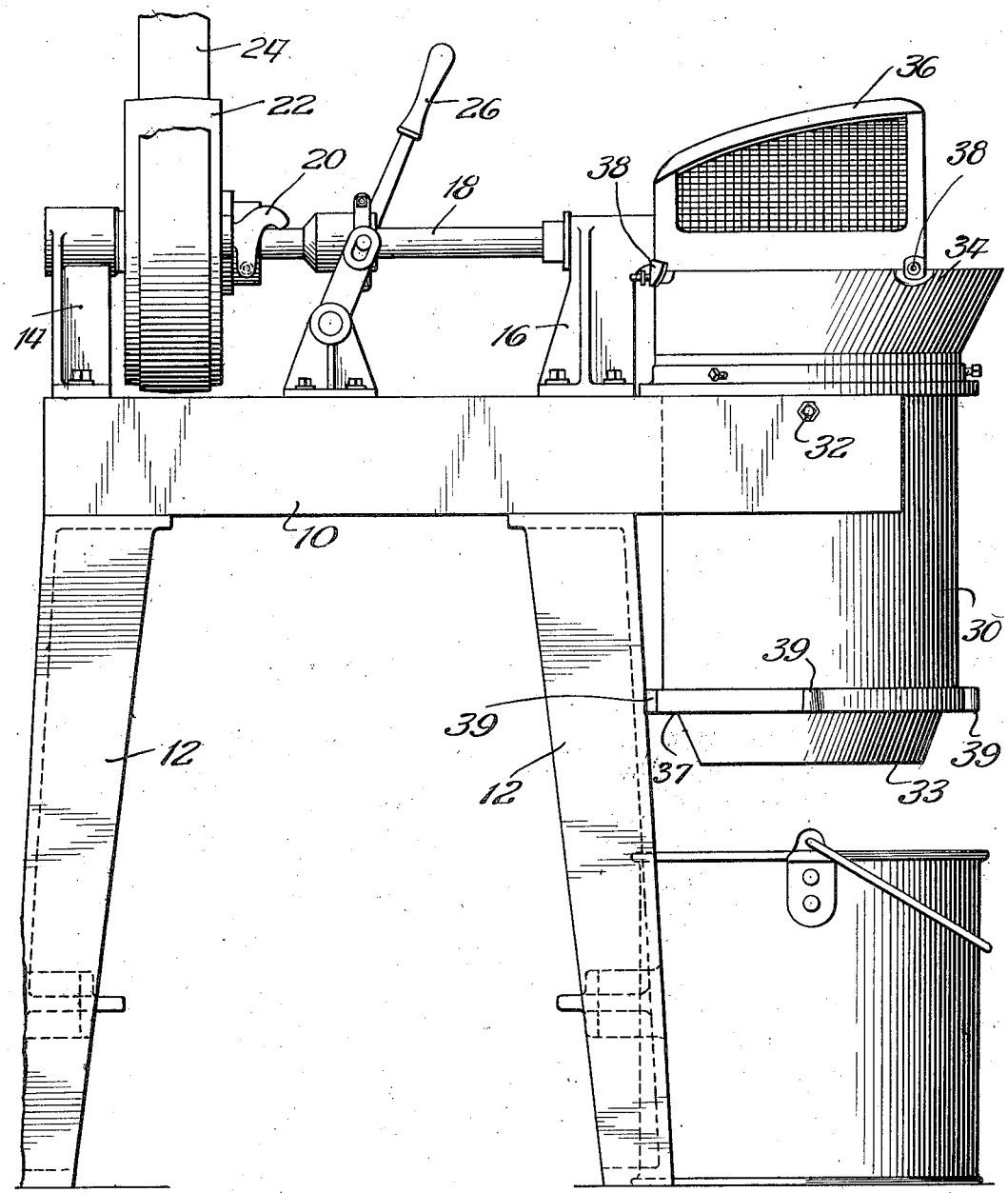

The apparatus will be described with particular reference to mechanism for chopping up vegetables, such as green and red peppers, pickles, cucumbers, cabbages, cauliflower, green and ripe tomatoes, onions, beans, and similar vegetables which it is desired to use in preparing relishes or similar spiced or pickled combinations.

In preparing relishes, one of the chief faults of the machines of the prior art has been that the cutting and dicing of the food products contained therein invariably results in pieces of unequal size and there are many long and irregular shaped slivvers and portions of the composition which renders the appearance, as well as the use thereof, somewhat undesirable. Further in order to cut down the size of the larger and irregularly shaped pieces the entire material must be run through the machine again resulting in mashing a considerable portion thereof.

The apparatus which I employ may comprise a bench member 10 which is supported upon suitable legs 12. The bench member 10 may have a pair of bearings 14 and 16 mounted thereon within which a cross-shaft 18 may be suitably journalled. The cross shaft 18 may be connected through a suitable clutch member 20 with a driving pulley 22 that is adapted to be driven by a belt 24 from any suitable power source. A clutch shifting mechanism 26 may be provided so that the mechanism may be controlled from the side of the bench member 10. The bench member 10 supports adjacent its outer end upon an annular ledge 28 a vertical cylindrical housing member 30 within which the knives, grates and separators may be suitably positioned. The cylindrical housing 30 may be positioned upon the ledge 28 and rigidly fastened in position by screw members 32 which pass through the walls of the bench member 10 and bear against the exterior surface of the housing 30. A funnel shaped member 34 may be secured to the upper end of the housing 30 and have positioned thereabove an arcuately shaped screen member 36. The screen member may be removably fastened to the funnel 34 by a plurality of fastening units 38. The bearing 16 may have a portion extending beyond the bench 10 which takes the shape of a gear housing 40 within which a pair of bevel gears 42 and 44 may be positioned. Bevel gear 42 may be keyed to the drive shaft 18 and bevel gear 44 may be keyed to the upper end of a cutter driving shaft 46.

The cutter drive shaft 46 may be connected to the cutter shaft 48 by a cross-pin 50 which extends through overlapping portions of each of these shafts and is covered by a collar member 52 carried upon the cutter shaft 46 by a removable pin 54. By this construction a simple and easy shaft connection is provided as well as guard means for the connection. The cutter shaft 48 may be non-circular in cross-section for the greater part of its length for a purpose which will be more apparent hereinafter. The cutter shaft 48 is adapted to lie directly in the center of the housing 30 and may have a plurality of cutters secured thereto. The upper cutter 56 may comprise a pair of arcuately shaped blades 58 and 60 extending from a central collar portion 62 which is secured to the shaft by a suitable fastening member 64. These blades may have downwardly sloped cutting edges.

Directly beneath the cutter blades 58 and 60 a grate member 66 is provided which has a plurality of sloped radial ribs 68 therein which will permit comparatively large articles to fall therethrough. Articles falling through the grate 66 will next come in contact with a knife member 70 which is provided with a plurality of arcuately shaped blades 72. It will thus be apparent that food particles dropping through the grate 66 will become greatly cut up by the action of the blades 72. These blades have a downwardly sloped cutting edge which has a tendency to pull materials downwardly.

The grate 74 is positioned below the cutter 70. The grate 74 is formed with a plurality of cross-ribs 76 which serve to divide the entire spacer into a plurality of comparatively square openings of a considerably reduced size. These ribs are all tapered downwardly so that pieces will not cling thereto and tend to block the openings but rather by gravity will fall therethrough. Thus it will be seen that food passing through the grate 74 will necessarily be chopped into fairly small particles.

Directly below the grate 74, a cutter member 78, generally similar to the cutter 70, is positioned. This cutter is so positioned for the purpose of cutting the particles as they fall through the grate 74. A spacer 79 is next in line on the shaft allowing the material passing through to drop by gravity to fall upon the next set of cutting blades. A similar cutter member 80 is positioned below said spacer and above the third grate member 82 which is provided with downwardly tapered cross-ribs 84 that serve to divide the spacer into a greatly increased number of small rectangular openings. A knife member 86, similar to the knives 70 and 78, is positioned directly below the grate 82 and thus food passing through the small openings 88 formed in the spacer 82 will necessarily be still further reduced in size by the action of the knife 86.

Food may drop from this point down through a spacer 90 to a pair of cutters 92 and 94 spaced therebelow and separated by a grate 96. The grate 96 will be similar to grate 82 except that the cross-ribs therein will form still smaller rectangular openings 97 therein. Food passing through the openings 97 in the grate 96 will all be chopped into sufficiently fine pieces to be capable of passing therethrough and food which is passed through this grate is ordinarily sufficiently chopped to be employed in the manufacture of relish. It will be understood that the ribs of each of the grate members described are inwardly tapered so that as food is cut up by the knife members above the grate, the same drops through the grate by gravity. If the openings had straight vertical walls instead of the walls as constructed, the downward movement by gravity would not result.

The lower end of housing 30 is screw-threaded, as shown at 31, and a funnel shaped member 33, having an annular flange 35, may be attached to the bottom of the housing and secured thereto by an annular ring-like nut member 37. Member 37 is formed with a plurality of outwardly extending lugs 39 which may be grasped to unscrew the same from the threading 31 or to tighten up thereon.

With the construction as described, it will be obvious that the number of knives and the spacing therebetween, as well as the size of the openings in the grate members, may be regulated as desired for the type of relish or food preparation it is desired to provide. It will be obvious that as many knives and as many grates as is desired can be employed, the maximum depending entirely upon the length of the shaft 48 as well as the housing 30. It will be seen that all of the knives are provided with non-circular openings so that the same may readily be keyed to the drive shaft 48 by being positioned thereon. Thus it is a simple matter to disassemble for cleaning, repairing or replacement any of the knives or grates.

It is only necessary to remove ring member 30 and the lower knives are instantly removably positioned so that they may be withdrawn at will. The cleaning and removal or changing of knives, grates or spacers is usually effected by first removing the container 30 from the machine. This may be done by removing screen 36 and funnel member 34 after which fastener members 32 may be withdrawn so that the container 30 may be removed. In order to disengage shaft 48, pin 54 is withdrawn and the collar removed. Thus the entire operating mechanism is easily removable.

All of the cutters 70, 78, 86, 92, and 94 are constructed with a circular reinforcing edge portion to which the ends of the arcuate blades are connected. These knife members are preferably made in one piece and made of stainless steel with the blade portions filed and ground thereon. By the construction shown, the blade portions are obviously held more rigid and the danger of breakage is much less.

While I have illustrated and described a specific embodiment of my invention I desire it to be understood that various changes and modifications may be made in the specific detail shown, and I do not wish to be limited, rather what I desire to secure and protect by Letters Patent of the United States is:

1. Apparatus of the class described comprising a vertical cylindrical housing, a vertical shaft axially positioned therein, a plurality of horizontally disposed cutter members mounted thereon, said cutter members formed with a plurality of arcuately shaped blades extending outwardly from the hub, a circular reinforcing edge connecting all of said blades, a horizontal grate adjacent each of said cutter members, said grates having the vertical walls of the openings therein inwardly tapered to allow material cut by said blades to drop through said openings by gravity.

2. Apparatus of the class described comprising a vertical cylindrical housing, a vertical shaft axially positioned therein, a plurality of pairs of horizontally disposed cutter members mounted thereon, said cutter members formed with a plurality of arcuately shaped blades extending outwardly from the hub, a circular reinforcing edge connecting all of said blades, a horizontal grate between each pair of said cutter members, said grates having the vertical walls of the openings therein inwardly tapered to allow material cut by said blades to drop through said openings by gravity.

3. Apparatus of the class specified adapted to work on material falling therethrough by gravity, comprising a vertical cylindrical housing, a vertical drive shaft axially positioned therein, a plurality of spaced horizontal knives mounted thereon, said knives formed with a plurality of arcuately shaped blades extending outwardly from the hub, a circular reinforcing edge connecting all of said blades, grates between each of said knives, said grates having different size openings therethrough, each one from the top grate down being correspondingly smaller than the one above, and the walls of said openings being inwardly tapered to provide downwardly tapered openings.

4. Apparatus of the class specified adapted to work on material falling therethrough by gravity, comprising a base member, a horizontal drive shaft mounted thereon, a vertical knife shaft connected to said drive shaft, a vertical cylindrical housing, said knife shaft axially positioned therein, a plurality of spaced horizontal knives mounted thereon, said knives formed with a plurality of arcuately shaped blades extending outwardly from the hub, a circular reinforcing ring connecting the ends of all of said blades, grates between each of said knives, and spacers between each of said grates, said grates having their cross-bars downwardly tapered and a lower funnel member secured to said housing and adapted to retain all said knives, grates and spacers in the operating position.

5. Apparatus of the class described, comprising a vertical housing member, an outwardly tapered funnel member mounted thereabove, a screen member secured to said funnel member, a downwardly tapered funnel member secured to the bottom of said housing, a fastening ring associated therewith, an axial vertical shaft in said housing, drive means associated therewith, a plurality of pairs of horizontally positioned knife members mounted on said shaft, said knives formed with a plurality of arcuately shaped blades extending outwardly from the hub, a circular reinforcing ring connecting the ends of all of said blades, and a grate member interposed between each of said pairs of knife members, said grate members having different size openings therethrough, each grate member, from the top grate down, being correspondingly smaller than the grate member above and the lowest grate member held in position by said lower, tapered funnel.

WILLARD C. McNITT.